United States Patent [19]

Osteen

[11] Patent Number: 4,665,620

[45] Date of Patent: May 19, 1987

[54] COMBINED TAPE MEASURE AND CLIPBOARD

[76] Inventor: Thomas P. Osteen, 9830 Grosalia Ave., La Mesa, Calif. 92041

[21] Appl. No.: 760,761

[22] Filed: Jul. 31, 1985

[51] Int. Cl.⁴ .............................................. B43L 5/00
[52] U.S. Cl. ...................................................... 33/138
[58] Field of Search .................................. 33/137, 138

[56] References Cited

U.S. PATENT DOCUMENTS

| | | | |
|---|---|---|---|
| 1,790,103 | 1/1931 | La Follette | 33/138 |
| 2,914,269 | 11/1959 | Freeman | 33/138 X |
| 3,739,478 | 6/1973 | Elenberger | 33/431 |

FOREIGN PATENT DOCUMENTS

| | | | |
|---|---|---|---|
| 10418 | of 1885 | United Kingdom | 33/138 |
| 1534971 | 12/1978 | United Kingdom | 33/138 R |

Primary Examiner—Harry N. Haroian
Attorney, Agent, or Firm—Tom Sherrard

[57] ABSTRACT

A two-function device incorporating the conventioanl tape measure and the conventional clipboard for use, one after the other, in close sequence. A modification of the invention includes a Velcro covered surface for retaining auxiliary articles such as pencils and calculators.

2 Claims, 6 Drawing Figures

COMBINED TAPE MEASURE AND CLIPBOARD

BACKGROUND OF THE INVENTION

Skilled persons in several disciplines desire to use tape measures and clipboards in rapid continuity. This occurs because of the need to promptly write down numbers from the tape before memories fade. In the field, the clipboard serves as a convenient writing surface for recording dimensions of things measured. Among the practitioners so involved are real estate appraisers and salespersons, contractors and construction trades people, insurance underwriters and adjusters and law enforcement officers. Unfortunately everyone requires both hands to use a tape measure. Therefore to keep the clipboard close by, it is common practice to put it under one's arm while measuring. This is far from ideal. The arm must often be raised to work around an obstruction while keeping the tape taut. This may allow the clipboard to fall to the ground. In any event, attempting to carry the clipboard while using the tape measure inhibits movement and interferes with proper use of the tape measure. With conventional devices an alternative procedure is to not carry the clipboard while measuring. Time must then be taken to abruptly separate the measuring operation from the recording operation. This increases the risk of not remembering nor recording information correctly. This invites costly mistakes.

The subject invention avoids the shortcomings of the prior art by incorporating the tape measure into a case, the cover of which also serves as a clipboard. Thus a person may with one hand hold both the tape and the writing surface and have the other hand free for operating the tape crank and writing down measurements. There is no longer the necessity of first manipulating the tape and then the clipboard because my invention has combined the two mechanisms into one unit.

DETAILED DESCRIPTION OF INVENTION

Figure 1:
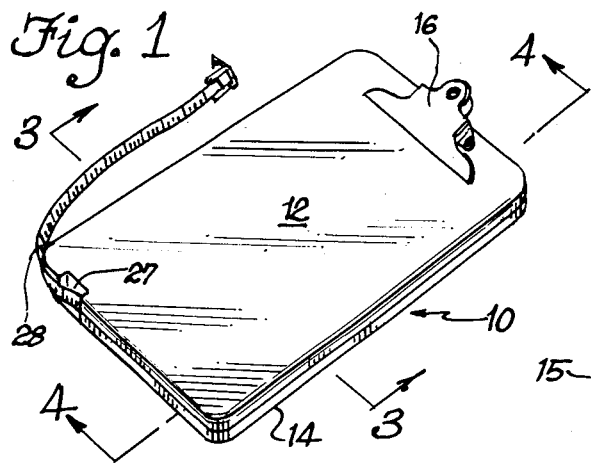
FIG. 1 is a perspective view of the device from the top thereof.
Figure 2:
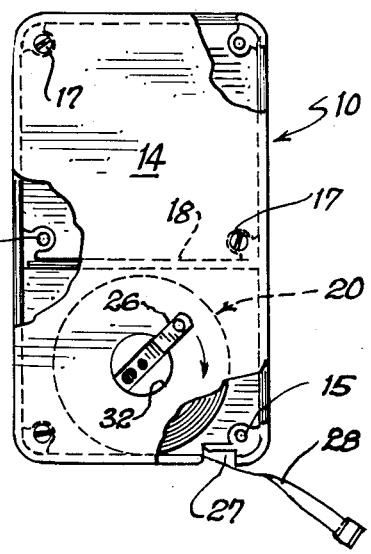
FIG. 2 is a bottom plan view with portions cut-away.
Figure 3:
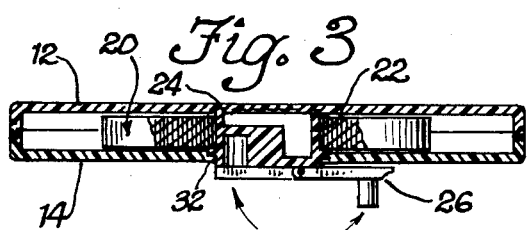
FIG. 3 is an end view taken along line 3—3 of FIG. 1.
Figure 4:
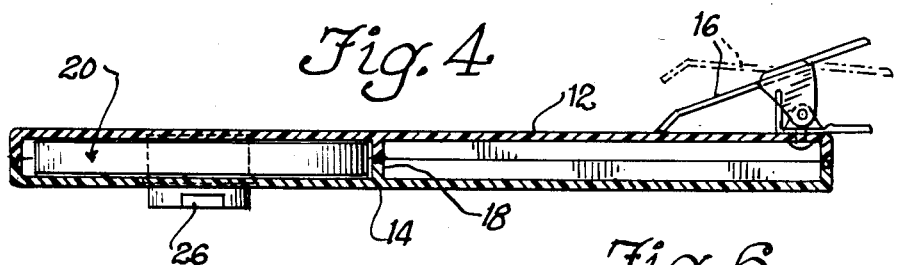
FIG. 4 is a side elevation taken along line 4—4 of FIG. 1.
Figure 5:
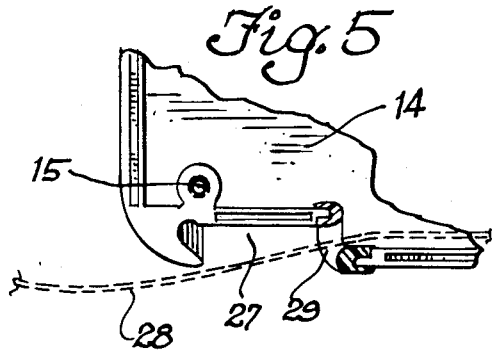
FIG. 5 is a detail of a corner area showing the tape entry and exit way.
Figure 6:
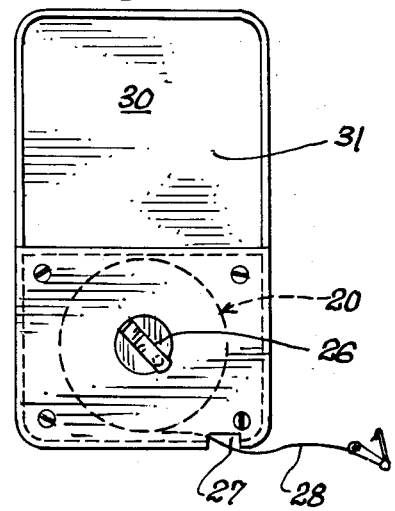
FIG. 6 is a bottom plan view of the modification of the device.

Referring to the drawings, where like numerals represent like parts throughout, the numeral 10 represents a body member. It is the casing or housing to which the other parts are integrated. It may be made of plastic or metal and is preferably fabricated of two rectangular sectors having rounded corners and flanged edges which overlap around their entire perimeters. The sectors are in parallel space relationship to each other to form a case in which the tape measure assembly is mounted. The sectors are held together by multiple screws 17 in orifices 15 as may be appropriate. The upper sector 12 serves dual purposes. It is flat and smooth on its outer exposed surface to serve as the typical writing surface of a clipboard. A conventional clip 16 is provided to retain papers, as is customary. Its other purpose is to retain the tape measure. Its enclosed underside is provided with a slightly raised circular boss portion 24 in which the conventional hub 22 of the tape measure is rotatably mounted. Attention is next invited to bottom sector 14. It is provided with an orifice 32 into which the other side of the tape hub is rotatably mounted. The described circular boss or ridge on one side and the orifice on the opposite side serve retainers and as bearings for the hub. A conventional crank 26 may be used to wind the strand of tape 28 into coil 20 as is customary. An aperature 27 with guide 29 is provided through the edge of the case to permit the tape to enter and leave the enclosure. It is not unlike those usually found on encased tapes. The final feature of my invention is a partition 18 extending across the sectors, from side to side, within the body. The partition is positioned close enough to the hub to form a chamber for snugly retaining the fully coiled tape. A modification of the device is depicted in FIG. 6. This form has only a partial bottom sector. Again, the partition serves to encase the coiled tape along an inward side but in this alternate form there is no bottom sector portion beyond the partition. In this form, an exposed surface member 30 ensues as the underside of a portion of upper sector 12. Member 30 is preferably provided with a covering of a dry adherent material 31. Particular reference is to material sold on the open market under the name Velcro. Small calculators, pencils and the like (not illustrated) may also be provided with a like adherent material for retaining the articles on member 30 when not in use. Such an arrangement would further facilitate the measuring and recording operations.

Having described my invention, I claim:

1. In combination A body member having two substantially rectangular sectors of like dimensions in parallel space relationship with each other having right angular edges which abut each other; fastening means for joining the sectors, one to another, to form a chamber; a writing surface portion formed as the outer surface of one of said sectors; a clip means for retaining papers at one end of the surface portion; a raised circular ridge portion integral with the enclosed side of the sector not having the writing surface; a hub mounted centrally within the ridge portion; a tape measure positioned for winding around the hub; an orifice through the sector on which the hub is mounted; a manually operatable crank one end of which is secured to the hub the opposite end of which is provided with a handle and the shaft of which extends through the orifice whereby the tape measure may be wound on the hub and an aperature provided with a conventional tape guide through a portion of the edges of the sectors for passage of the tape measure.

2. The claim according to claim 1 above wherein one sector has shorter dimensions than the other; a partition extending across the midsection of the longer sector to form an enclosed chamber which retains the tape measure and which leaves an open recess area on the opposite side of the partition and Velcro material affixed to the surface of the sector in the open area whereby writing materials and articles may be placed thereon.

* * * * *